United States Patent
Okada

(10) Patent No.: US 7,159,573 B2
(45) Date of Patent: Jan. 9, 2007

(54) FUEL FEED APPARATUS HAVING CONDUCTIVE MEMBERS GROUNDED EACH OTHER

(75) Inventor: Kingo Okada, Toyohashi (JP)

(73) Assignee: Denso Corporation (JP)

( * ) Notice: Subject to any disclaimer, the term of this patent is extended or adjusted under 35 U.S.C. 154(b) by 186 days.

(21) Appl. No.: 10/678,098

(22) Filed: Oct. 6, 2003

(65) Prior Publication Data
US 2004/0074995 A1    Apr. 22, 2004

(30) Foreign Application Priority Data
Oct. 18, 2002 (JP) .............................. 2002-304139
Aug. 21, 2003 (JP) .............................. 2003-297113

(51) Int. Cl.
*F02M 32/04* (2006.01)
(52) U.S. Cl. ................................. 123/509; 123/198 D
(58) Field of Classification Search ................ 123/509, 123/516, 497, 514, 198 D
See application file for complete search history.

(56) References Cited

U.S. PATENT DOCUMENTS

| 5,070,849 A | * | 12/1991 | Rich et al. ................... 123/509 |
| 5,669,359 A | * | 9/1997 | Kleppner et al. ........... 123/509 |
| 5,769,061 A |   | 6/1998 | Nagata et al. |
| 5,785,032 A |   | 7/1998 | Yamashita et al. |
| 6,000,913 A | * | 12/1999 | Chung et al. ................. 417/53 |
| 6,047,685 A |   | 4/2000 | Schelhas et al. |
| 6,073,614 A | * | 6/2000 | Kleppner ..................... 123/509 |
| 6,230,690 B1 | * | 5/2001 | Umetsu ....................... 123/509 |
| 6,604,511 B1 | * | 8/2003 | Hazama ....................... 123/509 |
| 6,679,227 B1 | * | 1/2004 | Sawert et al. ............... 123/509 |
| 6,776,185 B1 | * | 8/2004 | Farrar et al. ................ 137/560 |
| 2004/0011129 A1 | * | 1/2004 | Gilmour et al. .............. 73/313 |

FOREIGN PATENT DOCUMENTS

JP        11-324840        11/1999

* cited by examiner

*Primary Examiner*—Carl S. Miller
(74) *Attorney, Agent, or Firm*—Nixon & Vanderhye PC

(57) ABSTRACT

A fuel feed apparatus includes a grounded conductive resinous sub tank, a conductive fuel inlet pipe integrally formed with a bottom section of the sub tank and a conductive resinous jet nozzle included in a jet pump. The jet nozzle is welded on the bottom section of the sub tank, and has a nozzle port for jetting fuel. Here, the jet nozzle, the jet pump and the fuel inlet pipe are grounded via the sub tank without individual wiring member. Even if static electricity is generated due to friction between the jet nozzle and fuel jetted from the nozzle port, electrical charging can be prohibited. Thus, dielectric breakdown due to the electrically charging and cracking resulting from the dielectric breakdown can be also prohibited.

37 Claims, 5 Drawing Sheets

FUEL FEED APPARATUS HAVING CONDUCTIVE MEMBERS GROUNDED EACH OTHER

CROSS REFERENCE TO RELATED APPLICATION

This application is based on Japanese Patent Applications No. 2002-304139 filed on Oct. 18, 2002 and No. 2003-297113 filed on Aug. 21, 2003, the disclosure of which is incorporated herein by reference.

BACKGROUND OF THE INVENTION

The present invention relates to a fuel feed apparatus where fuel is supplied into a sub tank by a jet pump and sucked by a fuel pump to be discharged.

In general, an in-tank type fuel feed apparatus is disposed in a fuel tank for sucking fuel in the fuel tank and discharging the fuel. In such a fuel feed apparatus, fuel is apt to be charged with static electricity caused by friction between fuel discharged by a fuel pump in the fuel feed apparatus and a fuel outlet pipe, or between fuel discharged by a fuel pump and a filter element in a fuel filter. When fuel discharged by the fuel pump is charged with static electricity, members defining a passage downstream of the fuel pump and peripheral members around the passage downstream of the fuel pump are charged.

When a charged nonconductive member discharges its static electricity as corona discharge, discharge energy itself is low. However, if the charged nonconductive member exists near a non-grounded conductive member, an induction charge arises inside the non-grounded conductive member. Subsequently, if the non-grounded conductive member, in which induction charge is located near another conductive member, a spark may be caused between the conductive members, regardless whether the latter conductive member is grounded or not. Such a spark between the conductive members is apt to be caused in a condition such as low temperature, low vapor pressure of fuel and high air/fuel ratio (A/F) enough to be ignited in the fuel tank, for example. On the other hand, if a charge amount increases in the nonconductive member, the nonconductive members may cause dielectric breakdown. Accordingly, it is likely that a crack may be caused from the section where the dielectric breakdown is caused.

Generally, in an in-tank type fuel feed apparatus, a fuel feed pump is disposed in a sub tank. Here, the sub tank is accommodated in a fuel tank. A liquid level in the sub tank is controlled so that the fuel pump can suck fuel even if the liquid level in the fuel tank is decreased. In such a fuel feed apparatus, surplus fuel is returned from an engine and from a fuel pump. Such surplus fuel is supplied to a jet pump. Fuel in the fuel tank is sucked by negative pressure generated when the surplus fuel is jetted from a jet nozzle of the jet pump and is supplied to the sub tank.

In a fuel feed apparatus according to JP-A-11-324840, a fuel discharge pipe in a downstream of a fuel pump is electrically connected and grounded to prevent nonconductive members on the downstream side of the fuel pump from charging.

SUMMARY OF THE INVENTION

In view of the foregoing problems, it is an object of the present invention to propose a fuel feed apparatus where a jet pump is prevented from charging with static electricity.

In the present invention, a jet nozzle is made of conductive material to prevent a jet pump including the jet nozzle from charging. Therefore, the jet pump is avoided from causing dielectric breakdown due to increase of its charge amount. Accordingly, the jet pump is avoided from a cracking resulting from the dielectric breakdown. Additionally, the sub tank has a wide surface area, so that grounding can be performed freely. Therefore, the jet pump can be easily grounded via the sub tank.

Here, the jet nozzle is electrically connected with the sub tank directly. Besides, the jet nozzle included in the jet pump is grounded via a grounding terminal provided in the sub tank, so that the jet nozzle and the jet pump are prevented from charging. Therefore, a wiring member need not to be constructed for electrically connecting the jet nozzle, the jet pump and the sub tank.

A metallic joining member and a metallic forcing member can be easily grounded via a conductive mounting member and a conductive supporting member and the sub tank so as not to be charged.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS (First Embodiment)

Figure 1:
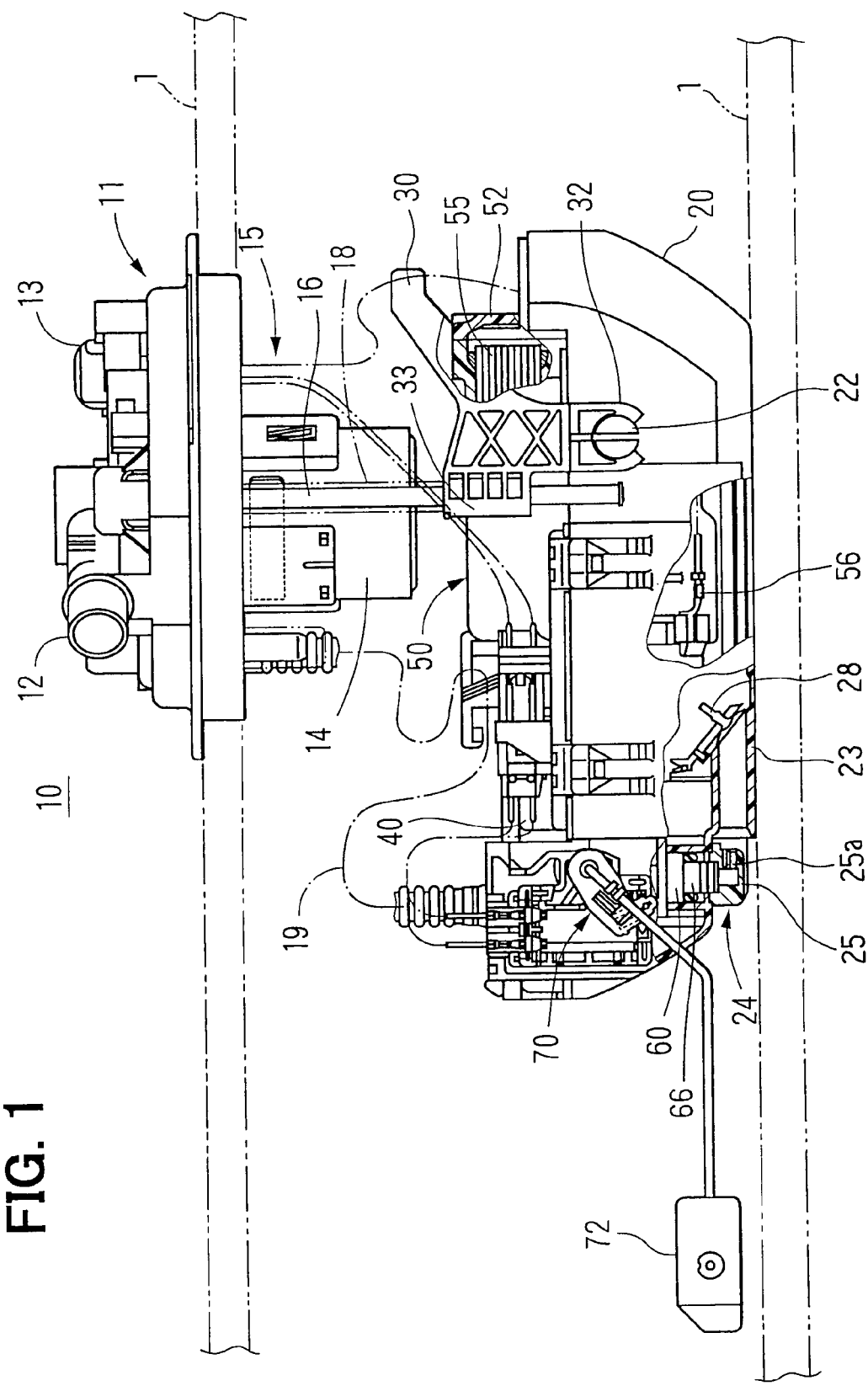
FIG. 1 is a partially cross-sectional side view showing a fuel feed apparatus according to a first embodiment of the present invention.

As shown in FIG. 1, a resinous flange 11 of a fuel feed apparatus 10 is mounted on a top wall of a resinous fuel tank 1. Other members of the fuel feed apparatus 10 are accommodated in the fuel tank 1. The flange 11 is used as a mounting member. An outlet pipe 12, an electric connector 13 and a vent valve 14 are built on the flange 11. The outlet pipe 12 is for supplying fuel discharged from a fuel pump 40 to outside the fuel tank 1. The fuel pump 40 is disposed in a sub tank 20. The outlet pipe 12 is connected with a pressure regulator 60 via a flexible tube 19. The pressure regulator 60 is provided on an outlet side of the fuel pump 40.

The connector 13 includes terminals for supplying electric power of the fuel pump 40 and a detection signal of a level sensor 70. The connector 13 has a grounding terminal for grounding the fuel feed apparatus 10. An electric part of the fuel pump 40, a grounding terminal 56 provided in the fuel filter 50 and the level sensor 70 are connected with the connector 13 via lead wires 15. The vent valve 14 is for exhausting inside air of the fuel tank 1 to outside the fuel tank 1 when fuel increases in the fuel tank 1.

A stay 30 is used as a supporting member. Claws 32 of the stay 30 fit on a stick-shaped fitting section 22 of the sub tank 20 so that the stay 30 is joined with the sub tank 20. The flange 11 and the stay 30 are coupled together with a metallic pillar 16 made of stainless steel or ferrous material. One end of the pillar 16 is inserted into a bottomed cylindrical member (not shown) formed in the flange member 11. The other end of the pillar 16 is inserted into a cylindrical section 33 in the stay 30. The sub tank 20 and the stay 30 are jointly movable with respect to the pillar 16 in the longitudinal direction of the pillar 16.

A coil spring 18 is used as a forcing member, and is made of stainless-steel or ferrous material as the pillar 16 is. The coil spring 18 is press-inserted into the cylindrical section 33. The coil spring 18 presses the cylindrical section 33 of the stay 30 downwardly from the flange 11 toward the sub tank 20 (i.e., toward a bottom of the fuel tank 1). Accordingly, the bottom face of the sub tank 20 is pressed onto the inner bottom face of the fuel tank 1 when the fuel feed apparatus 10 is mounted on the fuel tank 1. Therefore, the bottom section of the sub tank 20 is subjected to force by the coil spring 18 so as to be constantly pressed onto the inner bottom face of the fuel tank 1 regardless of expansion or shrinkage of the resinous fuel tank 1 due to changing inner pressure caused by temperature variation and changing amount of fuel in the fuel tank 1.

The sub tank 20 is made of resin, and has conductivity. A fuel inlet pipe 23 is integrally formed on the bottom section of the sub tank 20 with the same resin same as the sub tank 20. The fuel inlet pipe 23 has conductivity as well as the sub tank 20, and is used as a fuel inlet port. A check valve 28 is provided in an outlet port of the fuel inlet pipe 23 for preventing fuel from flowing in reverse direction from inside the sub tank 20 toward a jet pump 24.

The jet pump 24 has a jet nozzle 25. The jet nozzle 25 is joined on the outer bottom face of the sub tank 20 by welding or the like, and has a nozzle port 25a for jetting fuel. The jet nozzle 25 is made of resin, and has conductivity. Surplus fuel is exhausted from the pressure regulator 60, and the surplus fuel is jetted from the nozzle port 25a of the jet nozzle 25 toward the fuel inlet pipe 23 so that suction pressure (i.e., negative pressure lower than ambient pressure) is generated around the surplus fuel jetted from the nozzle port 25a. Fuel in the fuel tank 1 is sucked into the fuel inlet pipe 23 by the suction pressure generated by the jetted surplus fuel, and the surplus fuel sucked into the fuel inlet pipe 23 is fed into the sub tank 20.

Figure 2:
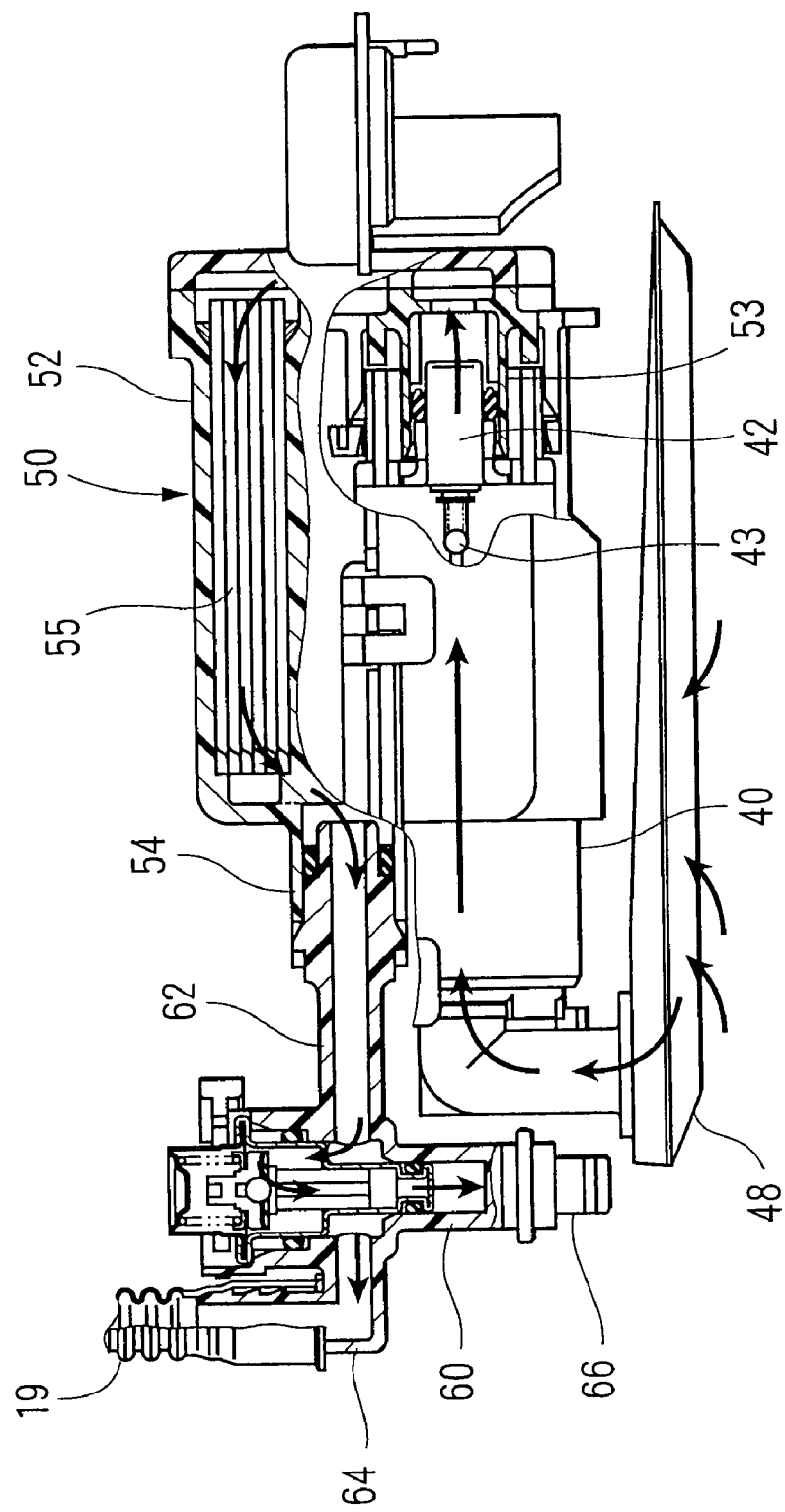
FIG. 2 is a partially cross-sectional side view showing a fuel flow according to the first embodiment.

As shown in FIG. 2, the fuel pump 40 is horizontally disposed in the sub tank 20, and sucks fuel inside the sub tank 20 through a suction filter 48, and discharges the fuel from a discharge port 42. A ball 43 is provided as a check valve on a upstream side with respect to the discharge port 42. The ball 43 prevents fuel from flowing in reverse direction from the discharge port 42 toward the inside of the fuel pump 40.

A fuel filter 50 includes a filter case 52 and a filter element 55 accommodated in the filter case 52. An inlet port 53 of the filter case 52 is fitted to the discharge port 42 of the fuel pump 40. The fuel filter 50 is horizontally provided in the sub tank 20, and covers upper periphery of the fuel pump 40. The filter case 52 of the fuel filter 50 is snap-fitted to the sub tank 20 and the fuel pump 40. Debris is removed from fuel discharged from the fuel pump 40 by the filter element 55.

As shown in FIG. 1, the grounding terminal 56 is provided in the filter case 52, and is electrically connected with another grounding terminal provided in the connecter 13 via the lead wires 15. Therefore, the fuel filter 50 is grounded via the filter case 52, the grounding terminal 56, the lead wires 15 and the connector 13.

As shown in FIG. 2, the inlet port 62 of the pressure regulator 60 fits to the outlet port 54 of the filter case 52. The pressure regulator 60 adjusts pressure of fuel flowing from the inlet port 62 after removal of debris by the fuel filter 50. The fuel flowing from the inlet port 62 is subjected to pressure adjustment by the pressure regulator 60.

As shown in FIG. 1, the pressure-adjusted fuel from the pressure regulator 60 is supplied to outside of the fuel tank 1 through the flexible tube 19 and the outlet pipe 12. Surplus fuel is generated while pressure of the fuel is adjusted by the pressure regulator 60, and the surplus fuel is exhausted from the pressure regulator 60. The surplus fuel passes through an outlet port 66, and is jetted from the jet nozzle 25 of the jet pump 24.

The level sensor 70 measures amount of fuel inside the fuel tank 1 by rotation of the level sensor 70 in accordance with a level of a float 72 floating on a fuel surface inside the fuel tank 1.

In this embodiment, the jet nozzle 25 is made of conductive resin, and is directly joined with the conductive sub tank 20. The sub tank 20 is snap-fitted to the fuel filter 50. The fuel filter 50 is grounded via the grounding terminal 56 provided in the filter case 52 included in the fuel filter 50. Therefore, the jet nozzle 25 is grounded via the sub tank 20, the fuel filter 50 and the grounding terminal 56 in this structure.

When the surplus fuel exhausted from the pressure regulator 60 is jetted from the jet nozzle 25 of the jet pump 24 toward the fuel inlet pipe 23, static electricity may be caused by friction between the jetted fuel and the jet nozzle 25. However, if the static electricity is caused in the jet nozzle 25, the static electricity is lead to ground via the grounding path such as the sub tank 20, the fuel filter 50 and the grounding terminal 56. Therefore, the jet nozzle 25 is prevented from charging with electricity.

Besides, fuel may be charged while passing the filter element 55. However, if the charged fuel is supplied to the jet nozzle 25 after passing through the filter element 55 included in the fuel filter 50 and the pressure regulator 60, the jet nozzle 25 is not charged. Therefore, the jet pump 24 including the jet nozzle 25 can be prevented from causing dielectric breakdown due to increase of its charge amount. Thus, the jet pump 24 is prevented from cracking resulting from the dielectric breakdown.

The fuel inlet pipe 23 can be prevented from charging if static electricity is generated by friction between suction fuel and the fuel inlet pipe 23. Because both the fuel inlet pipe 23 and the sub tank 20 are made of conductive resin and are integrally formed.

The stay 30 is made of conductive resin. The stay 30 is joined with the sub tank 20 by fitting the claw 32 to the fitting section 22. Furthermore, the pillar 16 is inserted into the cylindrical section 33 of the stay 30. That is, the pillar 16 is electrically connected with the stay 30 via the cylindrical section 33. Therefore, the pillar 16 and the coil spring 18 is grounded via the stay 30, the sub tank 20, the fuel filter 50 and the grounding terminal 56. Thus, the metallic pillar 16 and the metallic coil spring 18 can be prevented from charging.

Here, the fuel pump 40 can be disposed vertically. In this case, a member used as the stay 30 is not necessarily provided. However, if a conductive member directly contacting the pillar 16 and the coil spring 18 is provided instead of the stay 30, and is grounded in the same manner as the stay 30, the pillar 16 and the coil spring 18 can be prevented from charging.

(Second Embodiment)

Figure 3:
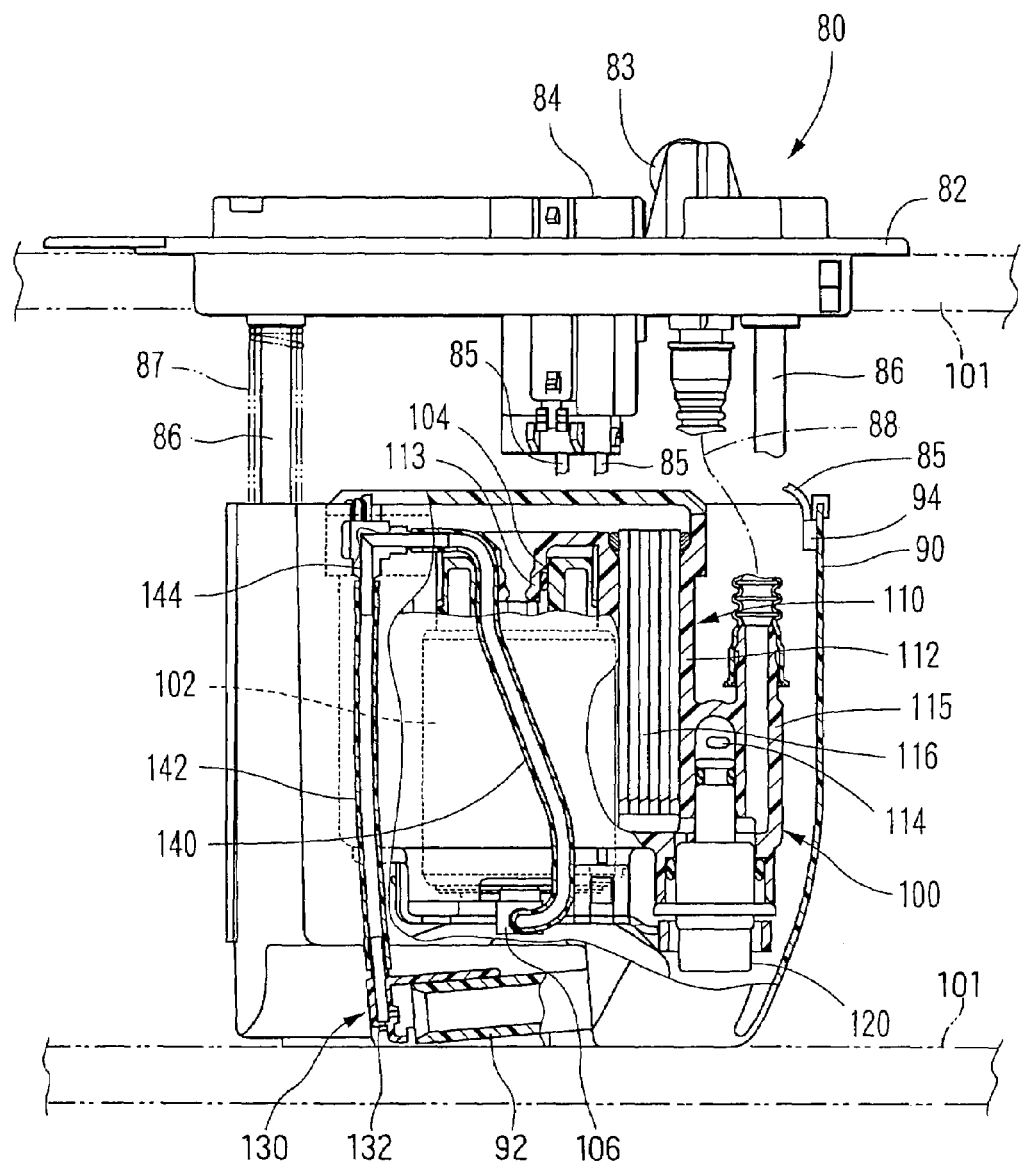
FIG. 3 is a partially cross-sectional side view showing a fuel feed apparatus according to a second embodiment of the present invention.

As shown in FIG. 3, a fuel feed apparatus 80 includes a flange 82, a sub tank 90, a pump module 100, a pressure regulator 120, and a jet pump 130. A fuel pump 102 is vertically disposed in the sub tank 90, differently from the fuel pump 40 according to the first embodiment.

The flange 82 used as a lid of the fuel feed apparatus 80 is formed in a disk-shape, and is mounted on the top wall of a fuel tank 101, and covers the opening of the fuel tank 101. Members of the fuel feed apparatus 80 are included in the fuel tank 101 except for the flange 82. An outlet pipe 83 and a connector 84 are built on the flange 82. The outlet pipe 83 is for supplying fuel discharged from the fuel pump 102 disposed inside the sub tank 90 to the outside of the fuel tank 101. The outlet pipe 83 is connected with a pressure regulator 120 through a flexible tube 88. The pressure regulator 120 adjusts pressure of fuel discharged from the fuel pump 102. The connector 84 includes terminals for supplying power of the fuel pump 102 and a signal detected by a level sensor (not shown). The connector 84 has a grounding terminal for grounding the fuel feed apparatus 80. An electric part of the fuel pump 102, a grounding terminal 94 provided in the sub tank 90 and the level sensor are connected with the connector 84 via lead wires 85.

The flange 82 is coupled with the sub tank 90 by two pillars 86. One ends of the pillars 86 are press-inserted into the flange 82. The other ends of the pillars 86 are loosely inserted into insertion sections (not shown) formed in the sub tank 90. A coil spring 87 is provided around an outer periphery of either of the two pillars 86. The coil spring 87 applies a force to the flange 82 and the sub tank 90 so as to depart them from each other. Therefore, the bottom section of the sub tank 90 is constantly pressed by the coil spring 87 so as to be pressed onto the inner bottom face of the fuel tank 101 regardless of expansion or shrinkage of the resinous fuel tank 101 due to changing inner pressure caused by temperature variation and changing amount of fuel in the fuel tank 101. Here, the coil spring 87 can be provided around each outer periphery of the two pillars 86.

The sub tank 90 is made of resin, and has conductivity. A fuel inlet pipe 92 is made of a resin similar to the sub tank 90, and is integrally formed with the sub tank 90 on the bottom section of the sub tank 90. Accordingly, the fuel inlet pipe 92 has conductivity. A grounding terminal 94 is provided on the upper wall of the sub tank 90. The grounding terminal 94 is connected with another grounding terminal provided in the connector 84 via the lead wires 85.

The pump module 100 includes the fuel pump 102 and a fuel filter 110. The fuel pump 102 raises pressure of fuel sucked from the sub tank 90 by rotation of an impeller (not shown) in a pressurization passage formed around the impeller, and discharges the pressurized fuel from the discharge port 104. The fuel filter 110 includes a filter case 112 surrounding the outer periphery of the fuel pump 102. A filter element 116 is contained in the filter case 112. The inlet port 113 of the filter case 112 is fitted to the discharge port 104 of the fuel pump 102.

Fuel after removal of debris by the fuel filter 110 is discharged from the fuel pump 102, and its pressure is adjusted by the pressure regulator 120 while the pressure regulator 120 exhausts surplus fuel from the exhaust port 114 of the pressure regulator 120 to the sub tank 90. The pressure-regulated fuel is supplied to the outside of the fuel tank 101 after passing through an outlet pipe 115, the flexible tube 88, the outlet pipe 83. Here, the outlet pipe 115 is integrally formed with the filter case 112.

The jet pump 130 is provided in the bottom area of the sub tank 90, and includes a jet nozzle 132. The jet nozzle 132 is made of resin, and has conductivity. The jet pump 130 and the fuel pump 102 are connected with two flexible nylon tubes 140, 142 and a resinous joint 144 connecting the both nylon tubes 140, 142. The joint 144 is hooked on an upper section of a side wall of the sub tank 90.

The nylon tube 140 is connected with a vent hole formed in the pressurizing passage of the fuel pump 102 via a connection member 106. Fuel exhausted from the vent hole is supplied to the jet pump 130 after passing through the nylon tube 140, the joint 144 and the nylon tube 142. When fuel supplied to the jet pump 130 is jetted from the jet nozzle 132, negative pressure is generated around the inlet of the fuel inlet pipe 92. Fuel inside the fuel tank 101 is sucked into the fuel inlet pipe 92 by the negative pressure generated by the fuel jetted from the jet nozzle 132, and is supplied into the sub tank 90.

The jet nozzle 132 is made of conductive resin, and is directly joined with the conductive sub tank 90. Furthermore, the sub tank 90 is grounded via the grounding terminal 94 provided in the sub tank 90. Therefore, the jet nozzle 132 is grounded via the sub tank 90 and the grounding terminal 94. Fuel discharged from the vent hole of the fuel pump 102 is jetted from the jet nozzle 132 of the jet pump 130 toward the fuel inlet pipe 92. Thus, the jet nozzle 132 can be prevented from charging even if static electricity is generated by friction between the jet nozzle 132 and fuel discharged from the jet nozzle 132. Therefore, the jet pump 130 including the jet nozzle 132 can be prevented from causing dielectric breakdown by avoiding the jet nozzle 132 from increasing its charge amount. Thus, the jet pump 130 is prevented from cracking resulting from the dielectric breakdown.

Here, if the nylon tubes 140, 142, the resinous joint 144 and the vent hole of the fuel pump 102 are made to be conductive, and the fuel pump 102 can be grounded from its vent hole. Thus, static electricity generated in the fuel pump 102 can be discharged via the vent hole, the nylon tube 140, the resinous joint 144, nylon tube 142, the jet nozzle 132, the sub tank 90 and the grounding terminal 94.

The fuel inlet pipe 92 can be prevented from charging if static electricity is generated by friction between suction fuel and the fuel inlet pipe 92, because the fuel inlet pipe 92 and the sub tank 90 are made of conductive resin, and are integrally formed, and the sub tank 90 is grounded via the grounding terminal 94. Furthermore, the grounding terminal (not shown) of the filter case 112 and the grounding terminal of the connector 84 can be connected with the lead wires 85 for grounding the fuel filter 110 in the same manner as the first embodiment.

(Other Embodiments)

In a fuel circulation flow, fuel returns from the engine to the fuel tank, and the fuel returned from the engine can be jetted from a jet nozzle of a jet pump instead of the surplus fuel exhausted from the pressure regulator 60 (first embodiment) or the discharged fuel from the vent hole of the fuel pump 102 (second embodiment). In this case, a fuel filter can be provided outside the fuel tank as an individual member apart from a fuel feed apparatus instead of the fuel filter 110 surrounding the outer periphery of the fuel pump 102 in the fuel tank 101 (second embodiment).

Here, the jet pump and the sub tank can be electrically connected using other wiring member or the like. The jet nozzle included in the jet pump can be grounded directly.

The sub tank can be a non-conductive resinous member. In this case, the jet nozzle is made to be conductive, and is electrically connected with another conductive member near the jet nozzle. Accordingly, the jet nozzle can be grounded via the other conductive member even if the sub tank is non-conductive. Therefore, the jet nozzle and the jet pump including the jet nozzle can be prevented from charging.

The fuel inlet pipe and the sub tank can be individually formed. In this case, preferably, the fuel inlet pipe is made to be conductive, and is grounded, although the fuel inlet pipe may be non-conductive.

The fuel tank can be made to be conductive. In this case, the fuel tank is grounded, so that the sub tank and the jet nozzle can be grounded via the fuel tank. Therefore, the sub tank need not to be individually grounded.

Figure 4:
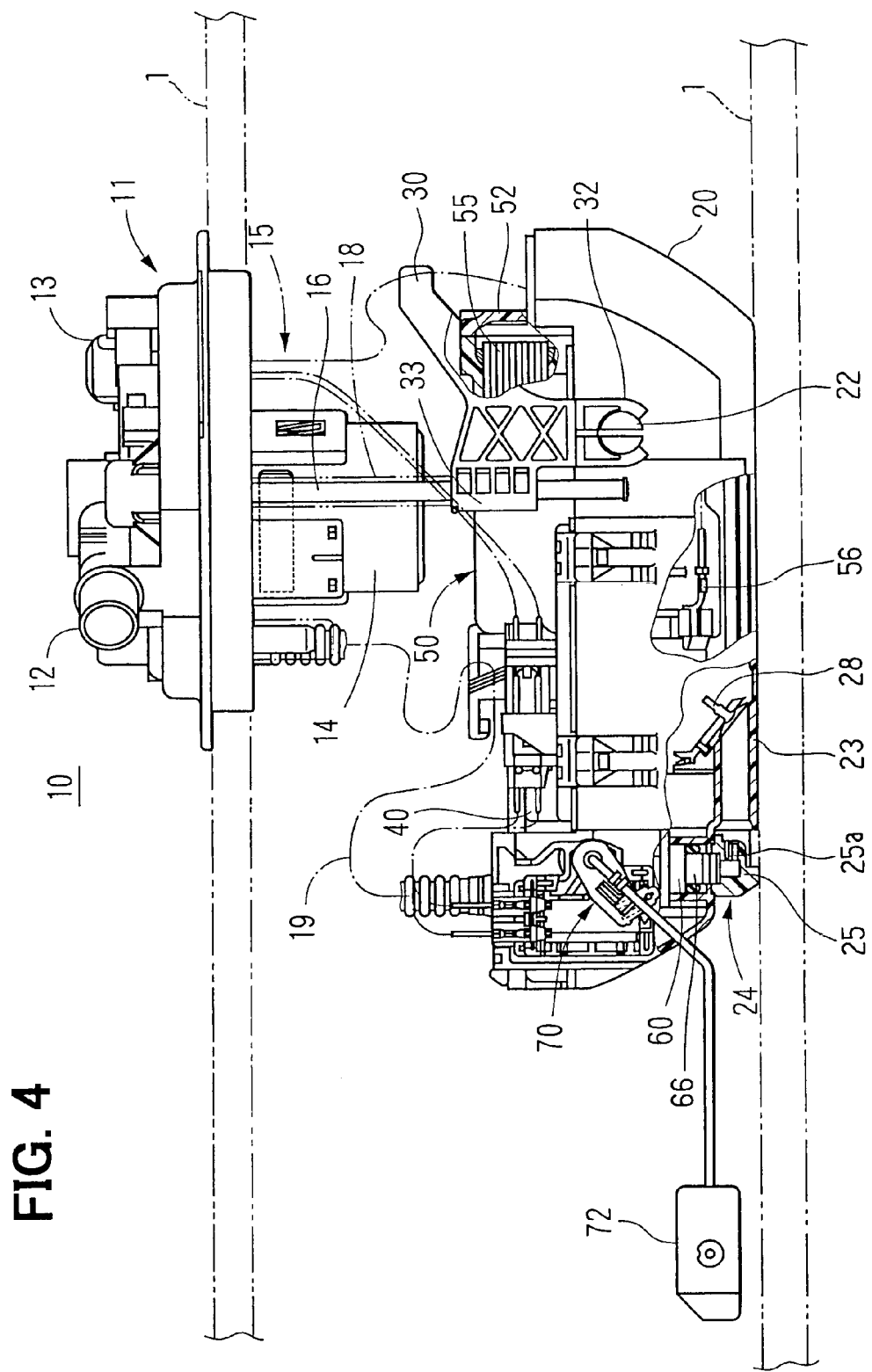
FIG. 4 is a partially cross-sectional side view showing a fuel feed apparatus according to a third embodiment of the present invention.
Figure 5:
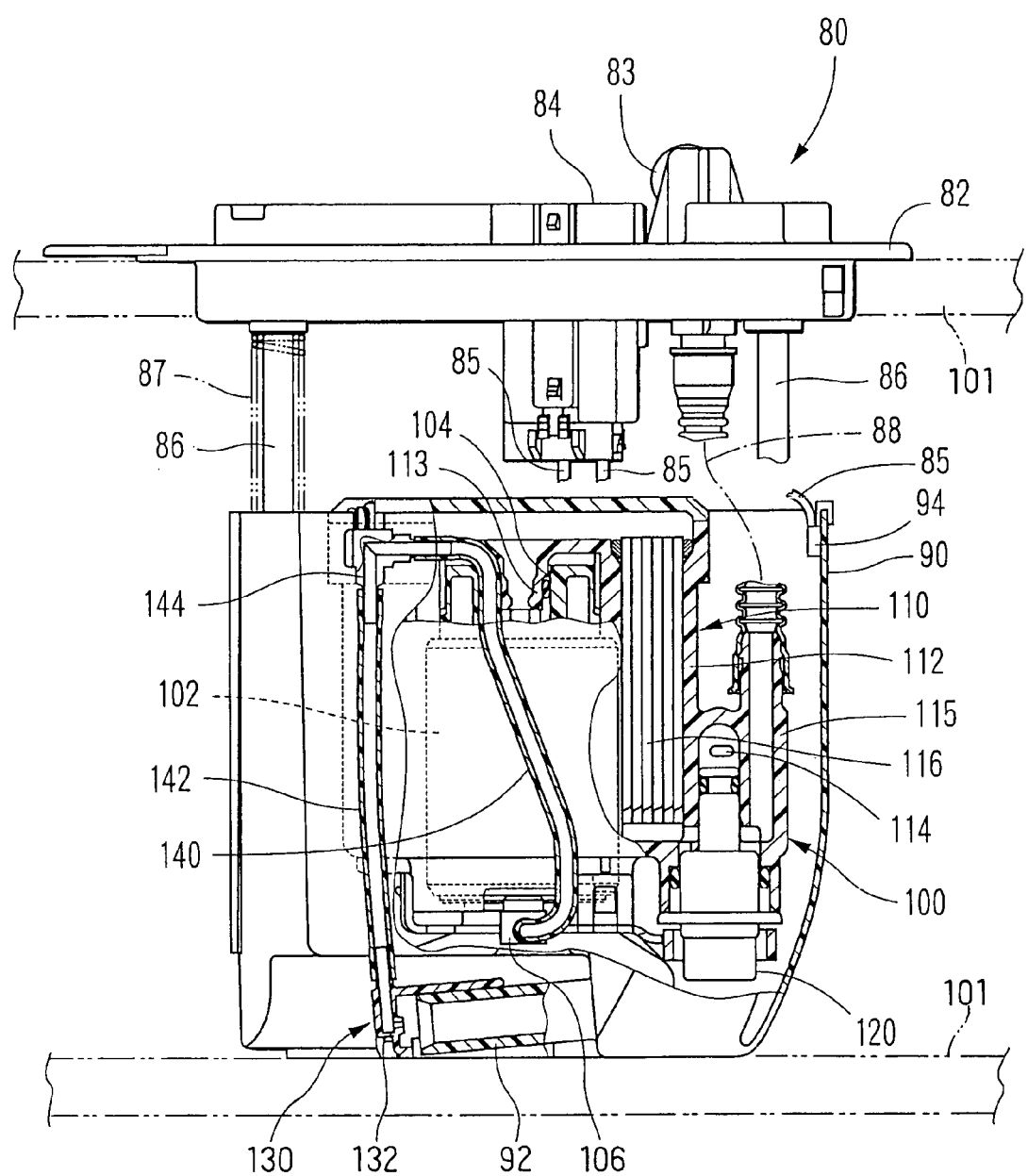
FIG. 5 is a partially cross-sectional side view showing a fuel flow according to a fourth embodiment.

Additionally, as shown in FIG. 4 (third embodiment) and FIG. 5 (fourth embodiment), the jet nozzle can be provided so as to contact the conductive fuel tank, so that the jet nozzle is directly grounded via the fuel tank. Here, the sub tank may not be necessarily conductive for being a grounding path. Accordingly, selection of material of the sub tank can be performed freely.

Other various changes and modifications are to be understood as being within the scope of the present invention as defined by the appended claims.

What is claimed is:

1. A fuel feed apparatus disposed in a fuel tank comprising:
    a sub tank included in the fuel tank;
    a fuel pump, included in the sub tank, for sucking fuel in the sub tank so as to discharge the fuel sucked from the sub tank;
    a jet pump having a jet nozzle for generating suction pressure by jetting fuel, the jet pump being for sucking fuel in the fuel tank by the suction pressure generated by the jet nozzle so as to supply the fuel sucked in the fuel tank to the sub tank, the jet nozzle being conductive; and
    a grounding terminal in the sub tank, the jet nozzle being grounded via the grounding terminal,
    a case that surrounds the fuel pump,
    wherein the case and the fuel pump are substantially horizontally disposed in the sub tank,
    the grounding terminal is provided on a lateral side of the case, and
    the grounding terminal is located on a side of a bottom surface of the sub tank with respect to a central axis of the case.

2. A fuel feed apparatus according to claim 1, wherein the jet nozzle and the sub tank are resinous and conductive.

3. A fuel feed apparatus according to claim 1, wherein the jet nozzle directly connects with the sub tank.

4. A fuel feed apparatus according to claim 1, wherein the jet nozzle is provided in a bottom area of the sub tank.

5. A fuel feed apparatus according to claim 1, further comprising:
    a fuel filter for removing debris contained in fuel discharged by the fuel pump, the case surrounding the fuel filter; and
    a pressure regulator for adjusting pressure of fuel flowing from the fuel filter while generating surplus fuel,
    wherein the pressure regulator supplies the surplus fuel thereof toward the jet nozzle.

6. A fuel feed apparatus according to claim 5, wherein the fuel filter is connected with the sub tank and the grounding terminal.

7. A fuel feed apparatus according to claim 2, further comprising:
    a fuel inlet pipe for supplying fuel to the fuel pump,
    wherein the fuel inlet pipe is resinous and conductive and integrally formed with the sub tank.

8. A fuel feed apparatus disposed in a fuel tank comprising:
    a sub tank included in the fuel tank;
    a fuel pump, included in the sub tank, for sucking fuel in the sub tank so as to discharge the fuel sucked from the sub tank;
    a jet pump having a jet nozzle for generating suction pressure by jetting fuel, the jet pump being for sucking fuel in the fuel tank by the suction pressure generated by the jet nozzle so as to supply the fuel sucked in the fuel tank to the sub tank, the sub tank being conductive, the jet nozzle being conductive and directly connected with the sub tank; and
    a grounding terminal in the sub tank, at least one of the jet nozzle and the sub tank being grounded via the grounding terminal,
    a case that surrounds the fuel pump,
    wherein the case and the fuel pump are substantially horizontally disposed in the sub tank,
    the grounding terminal is provided on a lateral side of the case, and
    the grounding terminal is located on a side of a bottom surface of the sub tank with respect to a central axis of the case.

9. A fuel feed apparatus according to claim 8, further comprising:
    a mounting member mounted on the fuel tank; and
    a joining member, wherein the joining member is conductive and connects the mounting member and the sub tank so as to be grounded via the sub tank.

10. A fuel feed apparatus according to claim 9, further comprising:
    a forcing member provided around an outer periphery of the joining member,
    wherein the forcing member applies force so as to space the sub tank from the mounting member.

11. A fuel feed apparatus according to claim 10, wherein the forcing member is conductive and grounded via the joining member and the sub tank.

12. A fuel feed apparatus disposed in a fuel tank comprising:
    a sub tank included in the fuel tank;
    a fuel pump, included in the sub tank, for sucking fuel in the sub tank so as to discharge the fuel sucked from the sub tank;
    a jet pump having a jet nozzle for generating suction pressure by jetting fuel, the jet pump being for sucking fuel in the fuel tank by the suction pressure generated by the jet nozzle so as to supply the fuel sucked in the fuel tank to the sub tank, the sub tank being conductive and grounded, the jet nozzle being conductive and directly connected with the sub tank so as to be grounded;
    a mounting member mounted on the fuel tank;
    a supporting member having conductivity connected with the sub tank; and
    a joining member, for connecting the mounting member and the supporting member, having conductivity and grounded via the supporting member and the sub tank.

13. A fuel feed apparatus according to claim 12, further comprising:
a forcing member provided around an outer periphery of the joining member,
wherein the forcing member applies force so as to space the supporting member from the mounting member.

14. A fuel feed apparatus according to claim 13, wherein the forcing member is conductive and grounded via the joining member, supporting member and the sub tank.

15. A fuel feed apparatus disposed in a fuel tank having conductivity and grounded comprising:
a sub tank included in the fuel tank;
a fuel pump, included in the sub tank, for sucking fuel in the sub tank so as to discharge the fuel sucked from the sub tank;
a jet pump having a jet nozzle for generating suction pressure by jetting fuel, the jet pump being for sucking fuel in the fuel tank by the suction pressure generated by the jet nozzle so as to supply the fuel sucked in the fuel tank to the sub tank, the sub tank having conductivity, the jet nozzle being conductive and directly connected with the sub tank; and
a grounding terminal in the sub tank, at least one of the jet nozzle and the sub tank being grounded via at least one of the grounding terminal and the fuel tank,
a case that surrounds the fuel pump,
wherein the case and the fuel pump are substantially horizontally disposed in the sub tank,
the grounding terminal is provided on a lateral side of the case, and
the grounding terminal is located on a side of a bottom surface of the sub tank with respect to a central axis of the case.

16. A fuel feed apparatus disposed in a fuel tank having conductivity and grounded comprising:
a sub tank included in the fuel tank;
a fuel pump, included in the sub tank, for sucking fuel in the sub tank so as to discharge the fuel sucked from the sub tank;
a jet pump having a jet nozzle for generating suction pressure by jetting fuel, the jet pump being for sucking fuel in the fuel tank by the suction pressure generated by the jet nozzle so as to supply the fuel sucked in the fuel tank to the sub tank, the jet nozzle being conductive and contacting the fuel tank; and
a grounding terminal in the sub tank, the jet nozzle being grounded via the fuel tank,
a case that surrounds the fuel pump,
wherein the case and the fuel pump are substantially horizontally disposed in the sub tank,
the grounding terminal is provided on a lateral side of the case, and
the grounding terminal is located on a side of a bottom surface of the sub tank with respect to a central axis of the case.

17. A fuel feed apparatus according to claim 1, further comprising:
a fuel filter that surrounds the fuel pump, the case surrounding the fuel filter, the fuel filter being substantially horizontally disposed,
wherein at least one of the jet nozzle and the fuel filter is grounded via the grounding terminal.

18. A fuel feed apparatus according to claim 17, further comprising:
a suction filter that is substantially horizontally disposed and spaced from the fuel filter in a substantially vertical direction,
wherein the grounding terminal is arranged in a bottom area of the sub tank, and
the grounding terminal is remote from a space between a central axis of the fuel filter and the suction filter in a vertical direction.

19. A fuel feed apparatus according to claim 8, further comprising:
a fuel filter that surrounds the fuel pump, the case surrounding the fuel filter, the fuel filter being substantially horizontally disposed,
wherein at least one of the jet nozzle, the fuel filter, and the sub tank is grounded via the grounding terminal.

20. A fuel feed apparatus according to claim 19, further comprising:
a suction filter that is substantially horizontally disposed and spaced from the fuel filter in a substantially vertical direction,
wherein the grounding terminal is arranged in a bottom area of the sub tank, and
the grounding terminal is away from a space between a central axis of the fuel filter and the suction filter in a vertical direction.

21. A fuel feed apparatus disposed in a fuel tank comprising:
a sub tank included in the fuel tank;
a fuel pump, included in the sub tank, for sucking fuel in the sub tank so as to discharge the fuel sucked from the sub tank;
a jet pump having a jet nozzle for generating suction pressure by jetting fuel, the jet pump being for sucking fuel in the fuel tank by the suction pressure generated by the jet nozzle so as to supply the fuel sucked in the fuel tank to the sub tank, the sub tank being conductive, the jet nozzle being conductive and directly connected with the sub tank; and
a grounding terminal provided on a lateral side of the fuel pump, the grounding terminal being in the sub tank, at least one of the jet nozzle and the sub tank being grounded via the grounding terminal,
wherein the fuel pump is substantially horizontally disposed in the sub tank,
the fuel feed apparatus further comprising:
a mounting member mounted on the fuel tank;
a supporting member having conductivity connected with the sub tank; and
a joining member, for connecting the mounting member and the supporting member, having conductivity and grounded via the supporting member and the sub tank.

22. A fuel feed apparatus according to claim 21, wherein at least one of the supporting member and the joining member is grounded via the grounding terminal.

23. A fuel feed apparatus according to claim 21, further comprising:
a forcing member provided around an outer periphery of the joining member,
wherein the forcing member applies force so as to space the supporting member from the mounting member.

24. A fuel feed apparatus according to claim 23, wherein the forcing member is conductive and grounded via the joining member, supporting member and the sub tank.

25. A fuel feed apparatus according to claim 24, wherein at least one of the supporting member, the joining member, and the forcing member is grounded via the grounding terminal.

26. A fuel feed apparatus according to claim 15, further comprising:

a fuel filter that surrounds the fuel pump, the case surrounding the fuel filter, the fuel filter being substantially horizontally disposed, wherein at least one of the jet nozzle, the fuel filter, and the sub tank is grounded via at least one of the grounding terminal and the fuel tank.

27. A fuel feed apparatus according to claim 26, further comprising:

a suction filter that is substantially horizontally disposed and spaced from the fuel filter in a substantially vertical direction, wherein the grounding terminal is arranged in a bottom area of the sub tank, and the grounding terminal is away from a space between a central axis of the fuel filter and the suction filter in a vertical direction.

28. A fuel feed apparatus according to claim 16, further comprising:

a fuel filter that surrounds the fuel pump, the case surrounding the fuel filter, the fuel filter being substantially horizontally disposed, wherein at least one of the jet nozzle and the fuel filter is grounded via at least one of the grounding terminal and the fuel tank.

29. A fuel feed apparatus according to claim 28, further comprising:

a suction filter that is substantially horizontally disposed and spaced from the fuel filter in a substantially vertical direction, wherein the grounding terminal is arranged in a bottom area of the sub tank, and the grounding terminal is away from a space between a central axis of the fuel filter and the suction filter in a vertical direction.

30. A fuel feed apparatus according to claim 1, wherein the case is substantially cylindrical, and the case is resinous.

31. A fuel feed apparatus according to claim 8, wherein the case is substantially cylindrical, and the case is resinous.

32. A fuel feed apparatus according to claim 15, wherein the case is substantially cylindrical, and the case is resinous.

33. A fuel feed apparatus according to claim 16, wherein the case is substantially cylindrical, and the case is resinous.

34. A fuel feed apparatus disposed in a fuel tank comprising:

a sub tank included in the fuel tank;

a fuel pump, included in the sub tank, for sucking fuel in the sub tank so as to discharge the fuel sucked from the sub tank;

a jet pump having a jet nozzle for generating suction pressure by jetting fuel, the jet pump being for sucking fuel in the fuel tank by the suction pressure generated by the jet nozzle so as to supply the fuel sucked in the fuel tank to the sub tank, the jet nozzle being conductive; and a grounding terminal in the sub tank, the jet nozzle being grounded via the grounding terminal, a case that surrounds the fuel pump, wherein the case and the fuel pump are substantially horizontally disposed in the sub tank, the grounding terminal is provided in the case, and the grounding terminal is located on a side of a bottom surface of the sub tank with respect to a central axis of the case.

35. A fuel feed apparatus disposed in a fuel tank comprising:

a sub tank included in the fuel tank;

a fuel pump, included in the sub tank, for sucking fuel in the sub tank so as to discharge the fuel sucked from the sub tank;

a jet pump having a jet nozzle for generating suction pressure by jetting fuel, the jet pump being for sucking fuel in the fuel tank by the suction pressure generated by the jet nozzle so as to supply the fuel sucked in the fuel tank to the sub tank, the sub tank being conductive, the jet nozzle being conductive and directly connected with the sub tank; and a grounding terminal in the sub tank, at least one of the jet nozzle and the sub tank being grounded via the grounding terminal, a case that surrounds the fuel pump, wherein the case and the fuel pump are substantially horizontally disposed in the sub tank, the grounding terminal is provided in the case, and the grounding terminal is located on a side of a bottom surface of the sub tank with respect to a central axis of the case.

36. A fuel feed apparatus disposed in a fuel tank having conductivity and grounded comprising:

a sub tank included in the fuel tank;

a fuel pump, included in the sub tank, for sucking fuel in the sub tank so as to discharge the fuel sucked from the sub tank;

a jet pump having a jet nozzle for generating suction pressure by jetting fuel, the jet pump being for sucking fuel in the fuel tank by the suction pressure generated by the jet nozzle so as to supply the fuel sucked in the fuel tank to the sub tank, the sub tank having conductivity, the jet nozzle being conductive and directly connected with the sub tank; and a grounding terminal in the sub tank, at least one of the jet nozzle and the sub tank being grounded via at least one of the grounding terminal and the fuel tank, a case that surrounds the fuel pump, wherein the case and the fuel pump are substantially horizontally disposed in the sub tank, the grounding terminal is provided in the case, and the grounding terminal is located on a side of a bottom surface of the sub tank with respect to a central axis of the case.

37. A fuel feed apparatus disposed in a fuel tank having conductivity and grounded comprising:

a sub tank included in the fuel tank;

a fuel pump, included in the sub tank, for sucking fuel in the sub tank so as to discharge the fuel sucked from the sub tank;

a jet pump having a jet nozzle for generating suction pressure by jetting fuel, the jet pump being for sucking fuel in the fuel tank by the suction pressure generated by the jet nozzle so as to supply the fuel sucked in the fuel tank to the sub tank, the jet nozzle being conductive and contacting the fuel tank; and a grounding terminal in the sub tank, the jet nozzle being grounded via the fuel tank, a case that surrounds the fuel pump, wherein the case and the fuel pump are substantially horizontally disposed in the sub tank, the grounding terminal is provided in the case, and the grounding terminal is located on a side of a bottom surface of the sub tank with respect to a central axis of the case.

* * * * *